(12) United States Patent
Schaaf et al.

(10) Patent No.: US 11,939,226 B2
(45) Date of Patent: Mar. 26, 2024

(54) AMMONIA PLANT HAVING A START-UP FURNACE AND METHOD FOR PRODUCING AMMONIA

(71) Applicants: THYSSENKRUPP INDUSTRIAL SOLUTIONS AG, Essen (DE); thyssenkrupp AG, Essen (DE)

(72) Inventors: Maximilian Schaaf, Dortmund (DE); Dirk Meurer, Dortmund (DE); Klaus Nölker, Dortmund (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 796 days.

(21) Appl. No.: 17/047,907

(22) PCT Filed: Apr. 15, 2019

(86) PCT No.: PCT/EP2019/059649
§ 371 (c)(1),
(2) Date: Oct. 15, 2020

(87) PCT Pub. No.: WO2019/201847
PCT Pub. Date: Oct. 24, 2019

(65) Prior Publication Data
US 2021/0107801 A1    Apr. 15, 2021

(30) Foreign Application Priority Data
Apr. 16, 2018   (DE) ............... 10 2018 108 989.9

(51) Int. Cl.
*C01C 1/04* (2006.01)
(52) U.S. Cl.
CPC .......... *C01C 1/0452* (2013.01); *C01C 1/0482* (2013.01)
(58) Field of Classification Search
CPC .................... C01C 1/0452; C01C 1/0482
See application file for complete search history.

(56) References Cited

U.S. PATENT DOCUMENTS

| 3,282,647 | A | 11/1966 | Skarstrom |
| 3,388,968 | A | 6/1968 | Spielman |
| 4,681,745 | A | 7/1987 | Pinto |
| 4,792,441 | A | 12/1988 | Wang |
| 7,070,750 | B2 | 7/2006 | Lippmann |
| 2009/0136391 | A1* | 5/2009 | Singh ............ B01J 8/0469 422/202 |

FOREIGN PATENT DOCUMENTS

| DE | 253 151 A | 1/1988 |
| DE | 696 17 878 T | 4/2002 |
| EP | 0 177 676 A | 4/1986 |
| EP | 1 339 641 B | 9/2004 |

OTHER PUBLICATIONS

English Translation of International Search Report issued in PCT/EP2019/059649, dated Jul. 4, 2019.

* cited by examiner

*Primary Examiner* — Yong L Chu
(74) *Attorney, Agent, or Firm* — thyssenkrupp North America, LLC

(57) ABSTRACT

An ammonia plant having a first and second reactor and a start-up oven having at least one first heat exchanger. The first reactor operates under a higher internal pressure than the second reactor. The start-up oven is connected via a piping system for at least one synthesis gas to the first and second reactor. Ammonia is produced by heating synthesis gas in the start-up oven and transferring the heated synthesis gas to the first reactor for initiating the chemical reaction. Synthesis gas is heated with the same start-up oven and is transferred to the second reactor for initiating the chemical reaction, wherein high-pressure synthesis of ammonia occurs in the first reactor and low-pressure synthesis of ammonia occurs in the second reactor at a lower process pressure than in the first reactor.

6 Claims, 2 Drawing Sheets

AMMONIA PLANT HAVING A START-UP FURNACE AND METHOD FOR PRODUCING AMMONIA

CROSS REFERENCE TO RELATED APPLICATIONS

This application is a U.S. National Stage Entry of International Patent Application Serial Number PCT/EP2019/059649, filed Apr. 15, 2019, which claims priority to German Patent Application No. DE 10 2018 108 989.9, filed Apr. 16, 2018, the entire contents of both of which are incorporated herein by reference.

BACKGROUND

Field

The present disclosure generally relates to an ammonia plant and a process for producing ammonia in an ammonia plant.

Start-up ovens are well known from the prior art. They are required in order to supply sufficient activation energy to chemical reactions or heat the reaction space to a suitable starting temperature.

For example, a process for liquid-phase hydrogenation with integrated gas-phase hydrogenation, in which a slurry heating oven is used as start-up oven, is disclosed in EP 0 177 676 A2.

U.S. Pat. No. 7,070,750 B2 discloses a process for producing synthesis gas for ammonia, in which the synthesis system located downstream is operated at a higher pressure than the synthesis system located upstream.

EP 1 339 641 A1 discloses a process for producing ammonia from synthesis gas, in which the synthesis of ammonia from synthesis gas is carried out successively in different synthesis systems. In all synthesis systems ammonia is in each case produced from part of the synthesis gas, and part thereof is discharged. Each subsequent synthesis system has a higher pressure than the respective preceding synthesis system.

In processes having different reaction chambers, a corresponding number of start-up ovens is normally required. In the synthesis of ammonia in particular, the low-pressure synthesis uses a different start-up oven than the high-pressure synthesis.

This incurs costs and is also disadvantageous for environmental protection reasons. However, this has hitherto been the only way to satisfy the requirements of the very different reactors.

DE 696 17 878 T2 discloses a process for producing ammonia, wherein the plant comprises a primary reformer, a secondary reformer, a water gas shift converter, a means for removing carbon dioxide and a methanator, wherein the worked up synthesis gas may then be supplied to a compressor and brought to an elevated pressure. This is followed by synthesis in a first ammonia converter which then has arranged downstream of it a second reactor in which further ammonia is produced using a different catalyst. A portion of the synthesis gas stream is recycled to the compressor after removal of ammonia. However, in this known process both ammonia reactors operate at identical synthesis pressure. This known process does not provide for preheating the synthesis gas for ammonia reactors operating at different synthesis pressures in a start-up phase in the same start-up oven.

Thus, a need exists for an ammonia plant and a process for producing ammonia by utilizing said ammonia plant for efficient reaction initiation.

DETAILED DESCRIPTION

Figure 1:
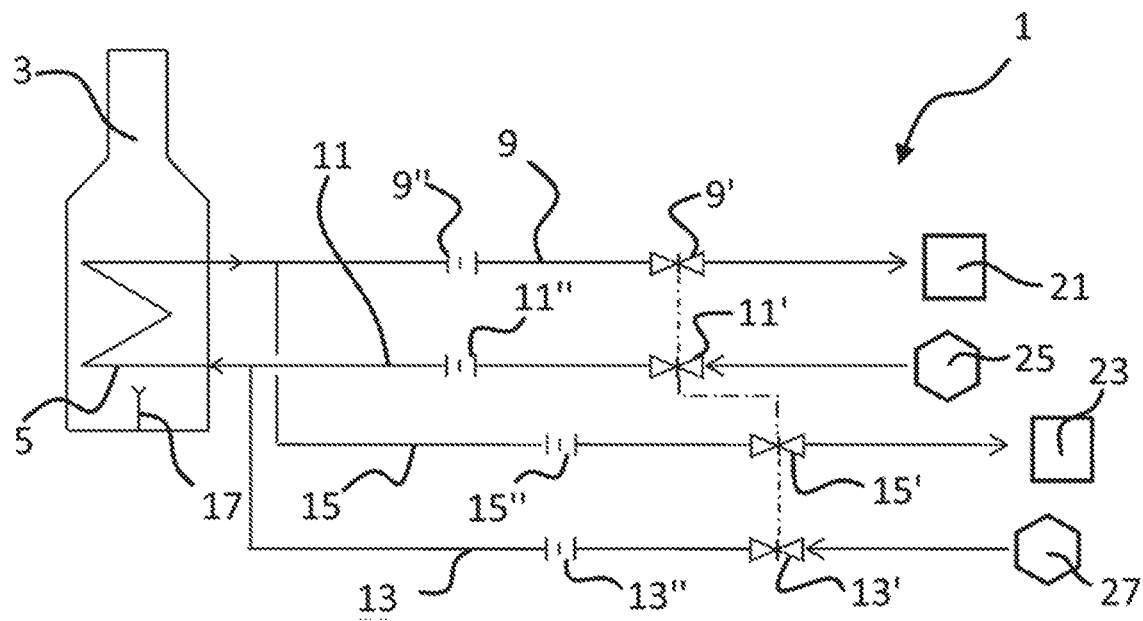
FIG. 1 is a schematic view of a first embodiment of the industrial plant.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an ammonia plant comprising a first reactor for a first ammonia synthesis and a second reactor for a second ammonia synthesis and a start-up oven having at least one first heat exchanger, wherein said start-up oven is connected to the first reactor via a piping system for the reactants of a first ammonia synthesis and connected to the second reactor via a piping system for the reactants of a second ammonia synthesis. The invention further relates to a process for producing ammonia, especially in such an ammonia plant.

According to the invention it is provided that the start-up oven is arranged in the flow path of the piping systems of the two reactors such that it may be connected only to the first pipes of the first reactor or only to the second pipes of the second reactor as desired.

The invention accordingly provides a plant for the synthesis of ammonia, comprising a first reactor and a second reactor and also a start-up oven having at least one first heat exchanger, wherein the first reactor, in particular for the high-pressure synthesis of ammonia, is designed and configured for a higher internal pressure than the second reactor, in particular for the low-pressure synthesis of ammonia, wherein said start-up oven is connected via a piping system for at least one reactant in the form of a synthesis gas both to the first and to the second reactor.

It has surprisingly been found that it is possible to utilize one and the same start-up oven to initiate reactions in constructionally distinct reactors. Accordingly provided is an industrial plant comprising a piping system which connects reactors designed for different pressures to the start-up oven, thus making it possible to achieve reaction initiation in these reactors with only one start-up oven.

In a suitable embodiment of the invention the at least one first heat exchanger is connected to the first and to the second reactor via the piping system, wherein shutoff valves are present to switch back and forth between the first and second reactor.

In one embodiment the start-up oven preferably also comprises a second heat exchanger, wherein the piping system has first and second pipes and wherein the first heat exchanger is connected to the first reactor via the first pipe and the second heat exchanger is connected to the second reactor via the second pipe. In a suitable embodiment it is provided that the first and second pipes are spaced apart from one another and separate from one another, in particular are not connected to one another via further pipes. It has surprisingly been found that both heat exchangers of the one start-up oven may be heated together, in particular utilizing the same burners.

In an alternative embodiment the start-up oven preferably comprises no second heat exchanger, especially preferably only precisely one heat exchanger. It is further preferable when only one pipe is passed through the start-up oven, in particular the first pipe.

Very particular preference is also given to embodiments in which the piping system is connected to only precisely one start-up oven.

In the context of the invention the reactants for producing ammonia in the first reactor and/or second reactor are a gas or gas mixture of nitrogen and hydrogen and optionally also ammonia and/or gases inert under the reaction conditions such as for example methane and/or argon.

In an advantageous embodiment the ammonia plant comprises a common source and/or a common feed conduit for the reactants for the first and second reactor, i.e. a single feed conduit is divided. In an alternative likewise preferred embodiment the industrial plant comprises a first source and/or first feed conduit for reactants for the first reactor and a second source and/or second feed conduit for reactants for the second reactor, i.e. there are different feed conduits for the reactants which are either combined at the first heat exchanger and divided again or passed through different heat exchangers of the same single start-up oven, in particular through the first and second heat exchanger.

In an advantageous embodiment the first heat exchanger is connected via the first pipe to the first reactor, wherein a third pipe branches off from the first pipe, wherein the first heat exchanger is connected to the second reactor via the third pipe. The third pipe preferably branches off after the first pipe has passed through the start-up oven. Two variants have been found to be particularly advantageous here. In the first variant simultaneous operation is possible, wherein the third pipe is supplied with reactants via the first pipe, i.e. a fourth pipe as described below for the second variant is not provided and the source of the reactants for the first reactor and the second reactor is identical. In this variant a pressure-reducing device which decreases the pressure in the first pipe is preferably provided in the third pipe. It is preferable to use an orifice plate or a valve. In the second variant said source is not identical, i.e. there is a first source for reactants for the first reactor and a second source for reactants for the second reactor and a fourth pipe which opens into the first pipe is provided, wherein the reactants may be transferred into the third pipe through the fourth pipe via a section of the first pipe which passes through the first heat exchanger. Shutoff valves in the first pipe, which separate the first reactor and the first source of the reactants from the third and fourth pipe, are preferably provided.

It is preferable when at least one one first shutoff valve is present in the first pipe to de-couple the first reactor from the third pipe and the first heat exchanger, wherein at least one second shutoff valve is present in the third pipe to decouple the first pipe from the second reactor. It is especially preferable when shutoff valves configured and adapted for decoupling the third and/or fourth pipe from the first reactor are present.

The invention further relates to a process for initiating a chemical reaction in an industrial plant as described hereinabove, wherein the process comprises the steps of:
 a. heating a synthesis gas for a first ammonia synthesis in a first reactor with a start-up oven and
 b. transferring the heated synthesis gas to this first reactor for the purpose of initiating the chemical reaction;
 c. heating a synthesis gas for a second ammonia synthesis in a second reactor with the same start-up oven and
 d. transferring the heated synthesis gas to this second reactor for the purpose of initiating the chemical reaction, wherein a high-pressure synthesis of ammonia is carried out in the first reactor and a low-pressure synthesis of ammonia is carried out in the second reactor at a process pressure which is lower than the process pressure in the first reactor.

When the terms low-pressure synthesis and high-pressure synthesis are used in the present invention this is to be understood as meaning that the low-pressure synthesis of ammonium is in any event carried out at a lower pressure than the high-pressure synthesis of ammonia. The respective pressure ranges contemplated for low-pressure synthesis may be varied over wide ranges and are especially in the range from 50 to 150 bar, preferably in a range from about 70 bar to about 130 bar. The low-pressure synthesis is carried out at about 120 bar for example. The high-pressure synthesis is generally carried out at a pressure of at least about 150 bar and the upper limit is in principle noncritical and depends on the configuration of the respective reactor and the conduits. The high-pressure synthesis of ammonia is carried out for example in a range from about 150 bar to about 250 bar, for example at about 220 bar.

Since this is a process in which two reactors are operated at respective different process pressures the compressor must be arranged in the conduit system such that it can bring the synthesis gas flowing in the pipes to the first reactor to a higher pressure than the synthesis gas flowing in the pipes to the second reactor. This may optionally be achieved using only one compressor which then comprises a plurality of compressor stages.

What is not provided for in the process according to the invention is passing the synthesis gas through two consecutively (serially) arranged ammonia reactors without increasing the pressure therebetween (as per the prior art). Even if a compressor were to be arranged between two ammonia reactors it would not be possible to use a start-up oven which is arranged in the flow path of the piping systems of the two reactors such that it may be connected only to the first pipes of the first reactor or only to the second pipes of the second reactor as desired.

In the process according to the invention the start-up oven is used for preheating the synthesis gas only in the start-up phase of the reaction and not during ongoing operation of the plant. This means that once the plant has been preheated and started up such that it is in regular operation a heating in the start-up oven is as a rule no longer intended. The advantage of the invention is that the same start-up oven may be used for heating the pipes of the first reactor and the first reactor itself and optionally also for heating the pipes of the second reactor and the second reactor itself. Accordingly only one start-up oven is required and the apparatus complexity for preheating the plant in the start-up phase is reduced.

Operation generally comprises initially preheating the region for high-pressure synthesis in the plant and starting up the high-pressure synthesis and only once this region has been started up preheating the region for low-pressure synthesis and starting up the low-pressure synthesis.

There are various variants for the mode of operation and the arrangement of the pipes for the two reactors. It is for example possible to arrange the pipes for the region of the low-pressure synthesis virtually parallel to the pipes for the region of the high-pressure synthesis and use two separate heat exchangers, one heat exchanger for each pipe loop, but arrange both heat exchangers in the same start-up oven.

It is alternatively possible to provide only one heat exchanger in the start-up oven, wherein both pipe loops for the high-pressure synthesis and also for the low-pressure synthesis may be connectable to this heat exchanger as desired.

It is alternatively also possible to pass only the pipe loop for one of the two systems, in particular the loop for the high-pressure synthesis, through a heat exchanger of the start-up oven, the pipe to the low pressure synthesis branching off from the outlet conduit of the heat exchanger to the reactor of the high-pressure synthesis after passing through the heat exchanger. While this conduit is then initially also at the pressure of the high-pressure synthesis it is possible to arrange a flow limiter downstream of the branching, for example in the form of an orifice plate, in order thus to reduce the pressure to the pressure range intended for the low-pressure synthesis.

The first reactant and the second reactant are each a synthesis gas for ammonia synthesis, wherein a high-pressure synthesis of ammonia is carried out in the first reactor and a low-pressure synthesis of ammonia is carried out in the second reactor. It has surprisingly been found that despite the extreme difference in conditions between a high-pressure synthesis and a low-pressure synthesis as are familiar to those skilled in the art the same start-up oven as described hereinabove may be employed.

In a first process variant according to the present disclosure the transfer of the synthesis gas to the first and second reactor is carried out successively, wherein a transfer of the first synthesis gas through the first heat exchanger and into the first reactor is followed by a transfer of the second synthesis gas through the first heat exchanger and into the second reactor.

In a second process variant according to the present disclosure the transfer may be carried out simultaneously or successively, in particular successively, wherein a transfer of the first synthesis gas through the first heat exchanger and into the first reactor is carried out and a proportion of the first synthesis gas is diverted into the second reactor after heating by the first heat exchanger.

In a third process variant according to the present disclosure the transfer may likewise be carried out simultaneously or successively, in particular simultaneously, wherein the first synthesis gas is passed through the first heat exchanger and into the first reactor and the second synthesis gas is passed through the second heat exchanger and into the second reactor.

It may preferably be provided that the start-up oven has burners operated with the same gas also used as reformer gas for producing hydrogen for the ammonia synthesis and/or that the start-up oven heats the first heat exchanger under atmospheric pressure.

Where reference is made in the description which follows to "reactants" this is, in the synthesis of ammonia, in each case to be understood as meaning synthesis gases containing the gases nitrogen and hydrogen as reactants. FIG. 1 shows a first embodiment of the industrial plant 1 comprising a first reactor 21 and a second reactor 23 and also a start-up oven 3 having at least one first heat exchanger 5, wherein the first reactor 21 is configured and adapted for a higher internal pressure than the second reactor 23, wherein said start-up oven 3 is connected via a piping system 9, 11, 13, 15 for at least one reactant both to the first and to the second reactor. In this embodiment the first heat exchanger 5 is connected via the first pipe 9, 11 to the first reactor 21, wherein a third pipe 15 branches off from the first pipe 9, wherein the first heat exchanger 5 is connected via the third pipe 15 to the second reactor 23. Here, the third pipe 15 branches off after the first pipe 9 has passed through the start-up oven 3. There is a first source 25 comprising a feed conduit 11 for reactants for the first reactor 21 and a second source 27 comprising a further feed conduit 13 for reactants for the first reactor 23. Said sources 25, 27 are thus not identical. A fourth pipe in the form of a feed conduit 13 which opens into the first pipe 11 is provided and the reactants may be transferred through the fourth pipe 13 via a section of the first pipe through the heat exchanger 5 into the third pipe 15. Shutoff valves 9', 11' in the first pipe are provided so as to separate the first reactor 21 and the first source 25 of the reactants from the third and fourth pipe 13, 15. The third and fourth pipe 13, 15 likewise have valves to allow separation of the second reactor 23 and a second source 27 from a closed circuit comprising the first source 25, the first heat exchanger 5 and the first reactor 21. Furthermore, orifice plates 9", 11", 13", 15" are in each case provided in order to be able to regulate the flow. A burner 17 is also depicted.

When using the industrial plant as shown in FIG. 1 the transfer of the at least one first reactant and/or second reactant into the first and second reactor 21, 23 is preferably carried out successively, wherein a transfer of the first reactants from the first source 25 through the first heat exchanger 5 and into the first reactor 21 is followed by a transfer of the second reactant from the second source 27 through the first heat exchanger 5 and into the second reactor 23.

Figure 2:
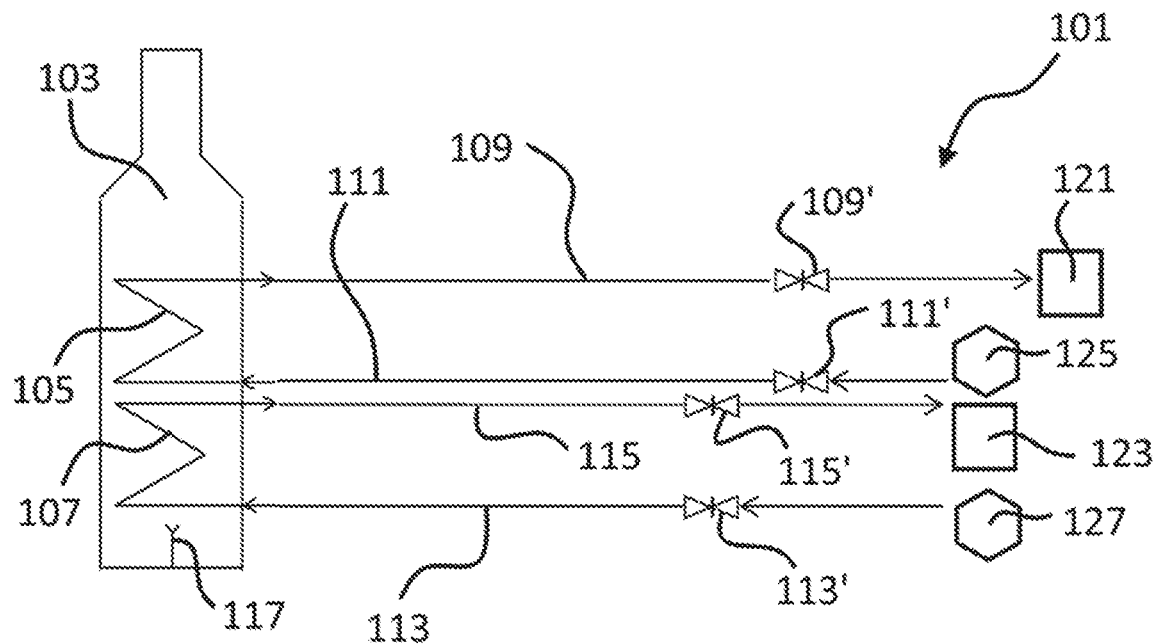
FIG. 2 is a schematic view of a second embodiment of the industrial plant.

FIG. 2 shows a second embodiment of the industrial plant 101 comprising a first reactor 121 and a second reactor 123 and also a start-up oven 103 having at least one first heat exchanger 105 and a second heat exchanger 107, wherein the first reactor 121 is configured and adapted for a higher internal pressure than the second reactor 123, wherein said start-up oven 103 is connected via a piping system 109, 111, 113, 115 for at least one reactant both to the first and to the second reactor 121, 123. The piping system has a first pipe 113, 115 and a second pipe 111, 109, wherein the first heat exchanger 105 is connected via the first pipe 109, 111 to the first reactor 121 and the second heat exchanger 107 is connected via the second pipe 113, 115 to the second reactor 123. It is provided that the first pipe 109, 111 and the second pipe 113, 115 are spaced apart from one another and separate from one another and not connected to one another via further pipes. It has surprisingly been found that both heat exchangers 105, 107 of the one start-up oven may be heated together, in particular utilizing the same burners. Separate first and second sources 125, 127 are also provided for and may be decoupled from the corresponding reactors 121, 123 via valves 113', 115', 109', 111'. A burner 117 is also depicted.

When using the industrial plant as shown in FIG. 2 the transfer is preferably carried out simultaneously, wherein the first reactant from the first source 125 is passed through the first heat exchanger 105 and into the first reactor 121 and the second reactant from the second source 127 is passed through a second heat exchanger 107 into the second reactor 123.

Figure 3:
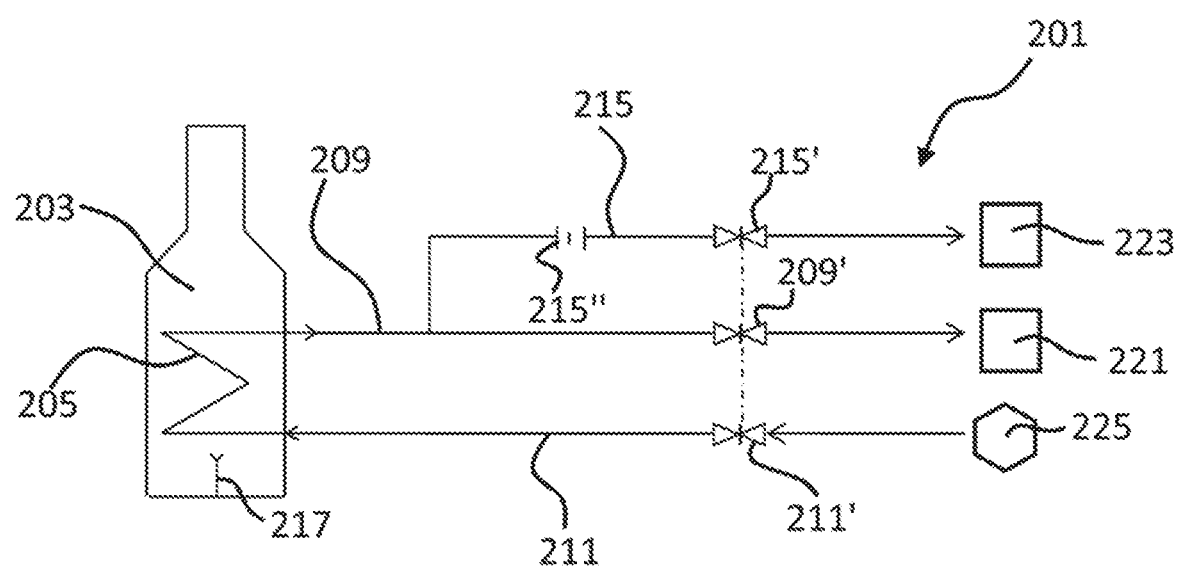
FIG. 3 is a schematic view of a third embodiment of the industrial plant.

FIG. 3 shows a third embodiment of the industrial plant 201 comprising a first reactor 221 and a second reactor 223 and also a start-up oven 203 having at least one first heat exchanger 205, wherein the first reactor 221 is configured and adapted for a higher internal pressure than the second reactor 223, wherein said start-up oven 203 is connected via a piping system 209, 211, 215 for at least one reactant both to the first and to the second reactor 221, 223. The first heat exchanger 205 is connected via the first pipe 211, 209 to the first reactor 221, wherein a third pipe 215 branches off from the first pipe 209, wherein the first heat exchanger 205 is connected via the third pipe 215 to the second reactor 223. The third pipe 215 branches off after the first pipe 209, 211 has passed through the start-up oven 203. Simultaneous operation is possible, wherein the third pipe 215 is supplied with reactants via the first pipe 209, 211, i.e. a fourth pipe is not provided and the source 225 of the reactants for the first and second reactor 221, 223 is identical. A valve 215' is provided to allow decoupling of the second reactor 223 from the first pipe 209, 211. Further valves 209', 211' make it possible to decouple the first reactor 221 and/or the first source 225. In this embodiment the orifice plate 215" which assists in flow regulation is of particular importance. A burner 217 is also depicted.

When using the industrial plant as shown in FIG. 3 the transfer is preferably carried out successively, wherein the first reactant from the source 225 is passed through the first heat exchanger 205 into the first reactor 221 and a proportion of the first reactant is diverted into the second reactor 223 after heating by the first heat exchanger 205.

The features of the invention disclosed in the above description, the claims and the drawings may be advantageous for realizing the invention both individually and in any desired combination.

What is claimed is:

1. An ammonia plant, comprising:
   a first reactor configured to generate a first ammonia synthesis;
   a second reactor configured to generate a second ammonia synthesis;
   a start-up oven having at least one first heat exchanger; and
   a piping system interconnecting the start-up oven to the first and second reactor;
   wherein said start-up oven is connected to the first reactor via first pipes of the piping system for delivering reactants for a first ammonia synthesis and connected to the second reactor via second pipes of the piping system for delivering reactants for a second ammonia synthesis;
   wherein the start-up oven is arranged in the flow path of the piping system such that the start-up oven is selectably connectable only to the first pipes or only to the second pipes.

2. The ammonia plant of claim 1, further comprising at least one compressor having at least two compressor stages, wherein the compressor is arranged in the flow path of the piping system and configured to produce an elevation of the process pressure in the second pipes of the second reactor while maintaining the process pressure in the first pipes of the first reactor.

3. The ammonia plant of claim 1, further comprising shutoff valves arranged in the piping system, the shutoff valves configured to switch the delivery of reactants to one or the other of the first and second reactor.

4. The ammonia plant of claim 1 wherein the start-up oven further comprises a second heat exchanger, wherein first heat exchanger is connected to the first reactor via the first pipes and the second heat exchanger is connected to the second reactor via the second pipes.

5. The ammonia plant of claim 1 wherein the first heat exchanger is connected to the first reactor via the first pipes, and wherein a third pipe branches off from the first pipes, wherein the first heat exchanger is connected to the second reactor via the third pipe.

6. The ammonia plant of claim 5 wherein at least one first shutoff valve is operatively associated with the first pipes and configured to decouple the first reactor from the third pipe and the first heat exchanger, wherein at least one second shutoff valve is operatively associated with the third pipe and configured to decouple the first pipe from the second reactor.

* * * * *